United States Patent [19]

Schäfer et al.

[11] Patent Number: 4,612,352

[45] Date of Patent: Sep. 16, 1986

[54] WATER-SOLUBLE OR WATER-DISPERSIBLE GRAFT POLYMERS, THEIR PREPARATION AND THEIR USE

[75] Inventors: Paul Schäfer, Riehen; Heinz Abel, Reinach; Christian Guth, Basel, all, Switzerland; Albert Stehlin, Rosenau, France

[73] Assignee: Ciba-Geigy Corporation, Ardsley, N.Y.

[21] Appl. No.: 673,212

[22] Filed: Nov. 19, 1984

Related U.S. Application Data

[63] Continuation of Ser. No. 509,103, Jun. 30, 1983, abandoned.

[30] Foreign Application Priority Data

Jun. 7, 1982 [CH] Switzerland ................ 4116/82

[51] Int. Cl.$^4$ ............... C08G 65/32; C08L 71/02
[52] U.S. Cl. .................... 525/404; 525/403; 525/531; 525/529; 525/530; 525/523; 528/393
[58] Field of Search ............ 525/404, 531, 529, 530, 525/403, 523; 528/393

[56] References Cited

U.S. PATENT DOCUMENTS

| 2,763,530 | 9/1956 | Schuetz | 8/43 |
|---|---|---|---|
| 3,202,638 | 8/1965 | Van Ess | 524/824 |
| 3,763,277 | 10/1973 | Chu et al. | 528/393 |
| 3,800,006 | 3/1974 | Katayama et al. | 525/386 |
| 4,025,484 | 5/1977 | Evani et al. | 326/317 |
| 4,028,434 | 6/1977 | Konter et al. | 525/531 |
| 4,057,598 | 11/1977 | Lundberg et al. | 524/535 |
| 4,196,065 | 4/1980 | Gaussens et al. | 204/196 |
| 4,242,474 | 12/1980 | Shinohara et al. | 525/404 |
| 4,308,185 | 12/1981 | Evans et al. | 525/523 |
| 4,355,122 | 10/1982 | Fan | 525/531 |

FOREIGN PATENT DOCUMENTS

| 0011833 | 6/1980 | European Pat. Off. | |
| 922457 | 4/1963 | United Kingdom | 525/404 |
| 971226 | 9/1964 | United Kingdom | 525/531 |
| 1351255 | 4/1974 | United Kingdom | |

Primary Examiner—Paul R. Michl
Assistant Examiner—Alex H. Walker
Attorney, Agent, or Firm—Edward McC. Roberts; Meredith C. Findlay

[57] ABSTRACT

Water-soluble or water-dispersible graft polymers comprising at least 20% by weight, based on said graft polymer, of a hydrophilic graft constituent bonded to a carbon atom and at least one hydrophobic radical which is bonded to the graft constituent via a polyglycol ether chain, the polyglycol ether chain containing 2 to 200

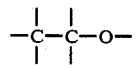

groups.

These graft polymers can be used individually, as mixtures or in combination with other active substances as, for example, antifoams, antistatic agents, builders, emulsifiers, padding assistants, wetting agents, paper deaerators, sludge dewatering assistants, textile assistants, greying inhibitors or detergents.

24 Claims, No Drawings

WATER-SOLUBLE OR WATER-DISPERSIBLE GRAFT POLYMERS, THEIR PREPARATION AND THEIR USE

This application is continuation of application Ser. No. 509,103, filed June 30, 1983, now abandoned.

The present application relates to novel water-soluble or water-dispersible graft polymers, processes for their preparation and their various uses, for example as padding assistants, textile assistants, wetting agents, detergents, antifoams or paper deaerators.

The graft polymers according to the invention contain at least 20% by weight, based on the graft polymer, of a hydrophilic graft constituent bonded to a carbon atom and at least one hydrophobic radical bonded to the graft constituent via a polyglycol ether chain, the polyglycol ether chain containing 2 to 200

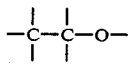

groups.

The novel graft polymers are preferably water-soluble. However, depending on the build-up of the polymer and the presence of the hydrophilic groups, they can also be in dispersed form in aqueous media. The hydrophilic graft constituent preferably contains acid groups which confer water-solubility, for example carboxyl and/or sulfonic acid groups.

The graft polymers accordng to the invention are products which, on the one hand, have a so-called parent chain of an anionic, cationic, amphoteric or, preferably, non-ionic polyalkylene oxide adduct which has a hydrophobic radical, and, on the other hand, contain grafted-on side chains of structural elements on individual carbon atoms of the polyglycol ether chain, said side chains being derived from ethylenically unsaturated polymerisable monomers containing hydrophilic groups, for example monomeric sulfonic acids or, preferably, carboxylic acids or anhydrides thereof.

The monomers required for introducing the side chains can be used singly or as mixtures with one another.

The anionic alkylene oxide adducts are preferably acid derivatives of non-ionic or cationic alkylene oxide adducts, for example adducts, containing acid ether groups or, preferably, ester groups of inorganic or organic acids, of alkylene oxides, especially ethylere oxide and/or propylene oxide, or styrene oxide, with organic hydroxyl, carboxyl, amino and/or amido compounds, or a mixture of these substances, containing aliphatic hydrocarbon radicals with a total of not less than 4, preferably 12, carbon atoms. These acid ethers or esters can be in the form of the free acids or in the form of salts, for example alkali metal, alkaline earth metal, ammonium or amine salts.

These anionic surfactants are prepared by known methods, for example by adduct formation of not less than 2 mols, preferably more than 2 mols, for example 10 to 100 mols, of ethylene oxide or propylene oxide, or of ethylene oxide and propylene oxide alternating in any sequence, with the above organic compounds and then etherifying or esterifying the adducts and, if appropriate, converting the ethers or esters into their salts. Possible base substances are higher fatty alcohols, i.e. alkanols or alkenols having in each case 8 to 22 carbon atoms, di-, tri-, tetra-, penta-or hexa-hydric aliphatic alcohols having 2 to 9 carbon atoms, alicyclic alcohols, phenylphenols, benzylphenols, alkylphenols with one or more alkyl substituents which have or which together have at least 4 carbon atoms, fatty acids having 8 to 22 carbon atoms, amines containing aliphatic and/or cycloaliphatic hydrocarbon radicals having at least 8 carbon atoms, especially fatty amines, hydroxyalkylamines, hydroxyalkylamides and fatty acid aminoalkyl esters containing such radicals, and dicarboxylic acids and polyalkylated aryloxycarboxylic acids.

Particularly suitable anionic polyalkylene oxide adducts are acid esters or salts thereof of a polyadduct of 2 to 100 mols, preferably up to 50 mols, of ethylene oxide with 1 mol of a fatty alcohol having 8 to 22 carbon atoms with 1 mol of a phenol containing at least one benzyl group, one phenyl group or, preferably, one alkyl group having at least 4 carbon atoms, for example benzylphenol, dibenzylphenol, dibenzyl-(nonyl)-phenol, o-phenylphenol, butylphenol, tributylphenol, octylphenol, nonylphenol, dodecylphenol and pentadecylphenol, it being possible for these acid esters to be used by themselves or as mixtures.

Preferred anionic polyalkylene oxide adducts are those of the formula

in which Y is alkyl or alkenyl, each having 8 to 22 carbon atoms, alkylphenyl having 4 to 16 carbon atoms in the alkyl moiety or o-phenylphenyl, X is the acid radical of an inorganic oxygen-containing acid, for example sulfuric acid or, preferably, phosphoric acid, or the radical of an organic acid and m is 2 to 40, preferably 2 to 15. The alkyl radical in the alkylphenyl is preferably in the para-position. The alkyl radicals in the alkylphenyl can be butyl, hexyl, n-octyl, n-nonyl, p-tert.-octyl, p-iso-nonyl, decyl or dodecyl. Alkyl radicals having 8 to 12 carbon atoms, especially the octyl or nonyl radicals, are preferred.

Examples of the fatty alcohols for the preparation of the anionic surfactants of the formula (1) are those having 8 to 22, in particular 8 to 18, carbon atoms, such as octyl, decyl, lauryl, tridecyl, myristyl, cetyl, stearyl, oleyl, arachidyl or behenyl alcohol.

The acid radical X is derived, for example, from low-molecular dicarboxylic acids, for example maleic acid, succinic acid or sulfosuccinic acid, and is bonded to the ethyleneoxy moiety of the molecule via an ester bridge. In particular, however, X is derived from inorganic polybasic acids, such as sulfuric acid or, in particular, orthophosphoric acid.

The acid radical X can be in the form of the free acid or in salt form, i.e., for example, as an alkali metal, ammonium or amine salt. Examples of such salts are lithium, sodium, potassium, ammonium, trimethylamine, ethanolamine, diethanolamine and triethanolamine salts.

Particularly preferred anionic surfactants are those of the formula

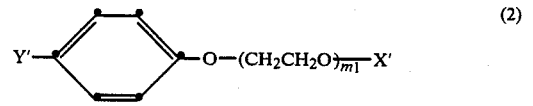

in which Y' is octyl or nonyl, $m_1$ is 2 to 15 and X' is an acid radical which is derived from sulfuric acid or, preferably, o-phosphoric acid, and the surfactants are in the form of free acids or sodium or ammonium salts. The acid phosphoric acid ester of the adduct of 5 to 12 mols of ethylene oxide with 1 mol of p-nonylphenol is of particular interest.

The anionic alkylene oxide adducts can be used individually or as mixtures for the preparation of the graft polymers.

Particularly suitable cationic polyalkylene oxide adducts are monoamines or polyamines having 2 or more, preferably 2 to 5, basic nitrogen atoms, it being possible for these amines to contain at least one polyglycol ether chain of the type defined and at least one lipophilic (hydrophobic) substituent, for example alkenyl or alkyl, each having 8 to 22 carbon atoms, and to be partly or completely quaternised.

These cationic alkylene oxide adducts are also known per se, and they can be prepared in a manner which is known per se, for example by reacting corresponding aliphatic amines, in which the alkyl or alkenyl radical preferably has 10 to 22 carbon atoms, for example dodecylamine, hexadecylamine, heptadecylamine, stearylamine, (tallow fat)-amine, arachidylamine, behenylamine and oleylamine, or di-, tri- or tetra-amines, such as dodecylpropylenediamine, octadecylethylenediamine and octadecyldiethylenetriamine, with at most 120 mols of an alkylene oxide, for example propylene oxide, but especially ethylene oxide, or a mixture of propylene oxide and ethylene oxide or, for example, 1 to 2 mols of styrene oxide and at most 35 mols of the alkylene oxides mentioned, and, if desired, by subsequently reacting the product with conventional quaternising agents, for example, methyl, ethyl or benzyl halides, diethyl sulfate or, especially, dimethyl sulfate, halogenohydrins or halogenocarboxylic acid amides, for example chloroacetamide.

Oxyalkylated fatty amines of the formula

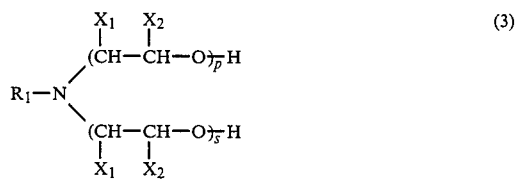

and quaternary ammonium compounds of the formula

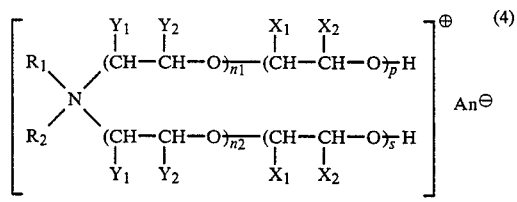

in which $R_1$ is alkyl or alkenyl, each having 10 to 22 carbon atoms, $R_2$ is alkyl having 1 to 4 carbon atoms, hydroxyalkyl having 2 to 4 carbon atoms, carbamoylmethyl or benzyl, preferably methyl, one of the radicals $Y_1$ and $Y_2$ is hydrogen and the other is phenyl, one of the radicals $X_1$ and $X_2$ is hydrogen or methyl and the other is hydrogen, $An^-$ is the anion of an inorganic or organic acid, in particular of a strong mineral acid or an organic sulfonic acid, for example the chloride, bromide, sulfate, benzenesulfonate, p-toluenesulfonate, methanesulfonate or ethanesulfonate ion, $n_1$ and $n_2$ are 0 or 1 and p and s are integers, the sum p+s being 3 to 25, are preferred.

In formulae (3) and (4), $R_1$ is preferably alkyl or alkenyl having 12 to 18 carbon atoms, in particular octadecyl or octadecenyl, and $X_1$ and $X_2$ are preferably hydrogen. The sum p+s is preferably 5 to 20. One of the indices $n_1$ and $n_2$ is preferably 1 and the other is 0.

Examples of suitable amphoteric alkylene oxide adducts are monoamines or polyamines having 2 or more, preferably 2 to 5, basic nitrogen atoms, it being possible for these amines to contain at least one corresponding acid, etherified or esterified polyglycol ether chain per basic nitrogen atom and at least one hydrophobic radical and in addition, where relevant, to be partly or completely quaternised.

Particularly preferred amphoteric surfactants are the monosulfuric acid esters of adducts of 3 to 15 mols of ethylene oxide with 1 mol of a fatty amine having preferably 12 to 22 carbon atoms or fatty amine mixtures, for example tallow fat)-amine.

Preferred graft polymers according to the invention have a parent chain consisting of at least one non-ionic alkylene oxide adduct which has a hydrophobic radical and on which the second terminal hydroxyl group is acylated, for example acetylated, or, in particular, unsubstituted. These non-ionic surfactants are advantageously alkylene oxide adducts of 2 to 200 mols of an alkylene oxide, for example ethylene oxide and/or propylene oxide, with 1 mol of an aliphatic monoalcohol having at least 8 carbon atoms, a tri-, tetra-, penta- or hexa-hydric aliphatic alcohol, a phenol, which is unsubstituted or substituted by alkyl, benzyl or phenyl, or a fatty acid having 8 to 22 carbon atoms.

Examples of aliphatic monoalcohols for the preparation of the non-ionic surfactants are water-insoluble monoalcohols having at least 8 carbon atoms, preferably 12 to 22 carbon atoms. These alcohols can be saturated or unsaturated and branched or straight-chain, and can be used by themselves or as mixtures. Naturally occurring alcohols, for example myristyl alcohol, cetyl alcohol, stearyl alcohol or oleyl alcohol, or synthetic alcohols, for example oxo-alcohols, such as, in particular, 2-ethylhexanol, and also trimethylhexanol, trimethylnonyl alcohol, hexadecyl alcohol or Alfols, can be reacted with the alkylene oxide.

Other aliphatic alcohols which can be reacted with the alkylene oxide are, in particular, glycerol, trimethylolethane, trimethylolpropane, erythritol, pentaerythritol, mannitol and sorbitol. The tri-, tetra-, penta- or hexa-hydric alcohols are preferably reacted with propylene oxide or ethylene oxide or mixtures of these alkylene oxides.

Examples of suitable unsubstituted or substituted phenols are phenol, benzylphenol, o-phenylphenol and alkylphenols in which the alkyl radical has a total of 4 to 16, preferably 4 to 12, carbon atoms. Examples of these alkylphenols are butylphenol, tributylphenol, octylphenol and, in particular, nonylphenol.

The fatty acids preferably have 8 to 12 carbon atoms and can be saturated or unsaturated, examples being capric, lauric, myristic, palmitic and stearic acid and decenoic, dodecenoic, tetradecenoic, hexadecenoic, oleic, linoleic, linolenic and, preferably, ricinoleic acid.

Examples of non-ionic surfactants are:
adducts of, preferably, 2 to 40 mols of alkylene oxides, in particular ethylene oxide, it being possible for individual ethylene oxide units to be replaced by substituted epoxides, such as styrene oxide and/or propylene oxide, with higher unsaturated or saturated fatty alcohols, fatty acids or fatty amides having 12 to 22 carbon atoms, or with phenylphenol or alkylphenols in which the alkyl radicals have at least 4 carbon atoms, preferably 4 to 12 carbon atoms;

alkylene oxide adducts of reaction products of a fatty acid containing 8 to 22 carbon atoms and a primary or secondary amine containing at least one hydroxy-lower alkyl group, the reaction being carried out such that the molar ratio between the hydroxyalkylamine and the fatty acid can be 1:1 or more than 1, for example 1.1:1 to 2:1; and addition products of propylene oxide with a tri-, tetra-, penta- or hexa-hydric aliphatic alcohol having 3 to 6 carbon atoms, for example glycerol or pentaerythritol, the polypropylene oxide adducts having an average molecular weight of 250 to 1,800, preferably 400 to 900.

Particularly suitable non-ionic surfactants are adducts of 2 to 40 mols of ethylene oxide with 1 mol of fatty alcohol or fatty acid, each having 12 to 22 carbon atoms, or with 1 mol of alkylphenol having a total of 4 to 12 carbon atoms in the alkyl moiety.

Both monocarboxylic acids and dicarboxylic acids and anhydrides thereof as well as sulfonic acids, in each case containing an ethylenically unsaturated aliphatic radical and preferably at most 7 carbon atoms, are suitable as the ethylenically unsaturated polymerisable carboxylic acids or sulfonic acids which are used for introducing the grafted-on monomers (side chains) into the polyalkylene oxide adducts described as the parent chain. Examples of the monocarboxylic acids are acrylic acid, methacrylic acid, α-halogenoacrylic acid, 2-hydroxyethylacrylic acid, α-cyanoacrylic acid, crotonic acid and vinylacetic acid. Ethylenically unsaturated dicarboxylic acids are, preferably, fumaric acid, maleic acid and itaconic acid, as well as mesaconic acid, citraconic acid, glutaconic acid and methylenemalonic acid. An anhydride of these acids is, in particular, maleic anhydride.

Examples of suitable sulfonic acids of the type defined are vinylsulfonic acid and 2-acrylamido-2-methylpropanesulfonic acid. The acid is preferably a monocarboxylic acid having 3 to 5 carbon atoms, in particular methacrylic acid and especially acrylic acid.

Graft polymers according to the invention which are of particular interest contain, as the parent chain, radicals of an adduct of 2 to 40 mols of ethylene oxide with 1 mol of a fatty alcohol having 12 to 22 carbon atoms or with 1 mol of an alkylphenol having a total of 4 to 12 carbon atoms in the alkyl moiety, or of 3 to 40 mols, preferably 5 to 25 mols, of ethylene oxide with 1 mol of a fatty amine having 10 to 22 carbon atoms, and, as side chains, at least 30% by weight, preferably at least 50% by weight and in particular 50 to 95% by weight, based on the graft polymer, of grafted-on acrylic acid.

Of these products, those which contain the radical of the adduct of 2 to 35 mols of ethylene oxide with 1 mol of octylphenol or, in particular, nonylphenol as the parent chain are preferred. If desired, these adducts can also be acetylated.

The graft polymers according to the invention are prepared by methods which are known per se, advantageously by bringing together (1) an anionic, cationic, amphoteric or non-ionic polyalkylene oxide adduct containing a hydrophobic radical and a polyglycol ether chain having 2 to 200

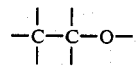

groups, and (2) at least 20% by weight, based on the graft polymer, of an ethylenically unsaturated polymerisable monomer, containing hydrophilic groups, for example corresponding carboxylic acids, anhydrides thereof or sulfonic acids, and carrying out the polymerisation in the presence of catalysts, advantageously at a temperature of 60° to 100° C.

Organic or inorganic initiators which form free radicals are preferably used as the catalysts. Examples of suitable organic initiators for carrying out the free radical polymerisation are symmetric aliphatic azo compounds, such as azo-bis-isobutyronitrile, azo-bis-2-methyl-valeronitrile, 1,1'-azo-bis-1-cyclo-hexanenitrile and alkyl 2,2'-azo-bis-isobutyrate; symmetric diacyl peroxides, for example acetyl, propionyl or butyryl peroxide, benzoyl peroxide, benzoyl peroxide substituted by bromine, nitro, methyl or methoxy groups, and lauroyl peroxide; symmetric peroxydicarbonates, for example diethyl, diisopropyl, dicyclohexyl and dibenzyl peroxydicarbonates; tert.-butyl peroctoate, tert.-butyl perbenzoate and tert.-butylphenyl peracetate, and peroxidecarbamates, such as tert.-butyl N-(phenylperoxy)-carbamate and tert.-butyl N-(2,3-dichloro- or 4-chlorophenyl-peroxy) carbamate. Other suitable organic peroxides are tert.-butyl hydroperoxide, di-tert.-butyl peroxide, cumene hydroperoxide, di-cumene peroxide and tert.-butyl perpivalate.

Suitable inorganic initiators are hydrogen superoxide, persulfates and peroxi-disulfates.

Dibenzoyl peroxide and potassium peroxi-disulfate are the preferred initiators (activators).

These catalysts are as a rule used in amounts of 0.1 to 10 per cent by weight, preferably 0.5 to 2 per cent by weight, based on the starting substances.

The grafting polymerisation is advantageously carried out under an inert atmosphere, for example in the presence of nitrogen.

The graft polymers are obtained as solutions or emulsions having a dry content of as a rule 20 to 30 per cent by weight and, after drying, give soft, waxy or brittle clear films, depending on their composition.

Graft polymers according to the invention can contain 5 to 80 per cent by weight of the anionic, cationic, amphoteric or non-ionic polyalkylene oxide adducts used as the parent chain and 95 to 20 per cent by weight of the grafted-on side chains. The polyalkylene oxide adduct used according to the invention as a rule has a polyglycol ether chain of average molecular weight 80 to 8,800, preferably 80 to 4,400 and in particular 80 to 1,500.

Preferred graft polymers contain 5 to 50 per cent by weight of radicals of the polyalkylene oxide adducts used as the parent chain and 50 to 95 per cent by weight of the monomers, such as acrylic acid, grafted on as side chains.

The polyalkylene oxide adducts used as the starting materials for the preparation of the novel graft polymers can be anionic, amphoteric, cationic or non-ionic, and the grafted-on monomers can contain, for example, carboxylic acid and/or sulfonic acid groups. Because of this large number of variations in the starting materials for their preparation, the novel graft polymers also have various properties and can therefore be used for very different end purposes.

For example, they can be used in antifoams for the textile industry, for industrial processes, for example for scrubbing gases, and for fermentation. They can also be used in liquid or pulverulent household detergents or detergents for fabrics and carpets. They can thus be used, for example, as builders by themselves or in combination with other builder substances, for example phosphates, in particular water-soluble alkali metal phosphates (polyphosphates or pyrophosphates), and/or silicates, and also in combination with soaps, for example potassium soaps, amine oxides, bleaching agents (persalts, peroxides or hydrates) and/or fluorescent brighteners. Another possibility is to add a combination of the graft polymers according to the invention and conventional surfactants, dispersing agents, protein-containing substances or, advantageously, homopolymers of acrylic acid or maleic acid, for example polymaleic anhydride, or copolymers of acrylic acid and methacrylic acid, methacrylonitrile, acrylates, methacrylates or vinyl monomers, copolymers of maleic acid and styrene, maleic acid and a vinyl ester or maleic acid and a vinyl ether, in particular a combination with carboxymethylcellulose, to the wash liquors.

Further complexing agents with which the graft polymers can be combined are polycarboxylic acids containing hydroxyl groups, such as citric acid or gluconic acid, and basic nitrogen compounds containing at least two nitrogen-bonded phosphonatomethyl or carboxymethyl groups, which may or may not be further substituted. These nitrogen compounds are aminoalkyleneacetic acids, aminocycloalkyleneacetic acids and aminoalkylenephosphonic acids and N-sulfoalkaneaminophosphonic acids, for example nitrilotriacetic acid, ethylenediaminetetraacetic acid $\beta$-hydroxyethylethylenediaminetriacetic acid, cyclohexylenediaminetetraacetic acid, diethylenetriaminepentaacetic acid or nitrilo-tris-(methylenephosphonic acid), 1-aminoethane-1,1-diphosphonic acid, N-sulfoethane-1-amino-ethane-1,1-diphosphonic acid, 1-hydroxy-3-amino-propane-1,1-diphosphonic acid, ethylenediamine-tetra(methylenephosphonic acid), diethylenetriamine-penta(methylenephosphonic acid), hexamethylenediamine-tetra(methylenephosphonic acid) and the water-soluble salts, for example sodium salts or magnesium salts, of these acids.

The solutions or emulsions, obtained according to the invention, of the novel graft polymers are also used for soil release and for antistatic finishing, for reducing the deposition of soil during washing and for hydrophilising textiles which, preferably, consist at least partly of synthetic fibres, for example polyester, polyamide, polyacrylonitrile or polypropylene.

The novel graft polymers can also be used in alkaline wetting agents, preferably in combination with peroxides or persulfates.

They can furthermore be used for the dewatering of sludge and as dye solvents or antigelling agents. Paper deaerators and carriers of active ingredients for agrochemicals are further possibilities of using the novel substances.

In the examples which follow, parts and percentages are by weight. "ppm" means "parts per million".

The products below are examples of the anionic, cationic, amphoteric and non-ionic polyalkylene oxide adducts used as the parent chain or component (1).

A. Anionic Polyalkylene Oxide Adducts $A_1$ the ammonium salt of the acid sulfuric acid ester of the adduct of 2 mols of ethylene oxide with 1 mol of Alfol (1014);

$A_2$ the ammonium salt of the acid sulfuric acid ester of the adduct of 2 mols of ethylene oxide with 1 mol of stearyl alcohol;

$A_3$ the ammonium salt of the acid sulfuric acid ester of the adduct of 3 mols of ethylene oxide with 1 mol of 2-ethyl-hexanol;

$A_4$ the ammonium salt of the acid sulfuric acid ester of the adduct of 15 mols of ethylene oxide with 1 mol of stearyl alcohol;

$A_5$ the ammonium salt of the acid sulfuric acid ester of the adduct of 3 mols of ethylene oxide with 1 mol of tridecyl alcohol;

$A_6$ the ammonium salt of the acid sulfuric acid ester of the adduct of 4 mols of ethylene oxide with 1 mol of hydroabietyl alcohol;

$A_7$ the ammonium salt of the acid sulfuric acid ester of the adduct of 3 mols of ethylene oxide with 1 mol of Alfol (2022);

$A_8$ the ammonium salt of the acid sulfuric acid ester of the adduct of 3 mols of ethylene oxide with 1 mol of lauryl alcohol;

$A_9$ the di-($\beta$-hydroxy-ethyl)-amine salt of the acid sulfuric acid ester of the adduct of 3 mols of ethylene oxide with 1 mol of lauryl alcohol;

$A_{10}$ the sodium salt of the acid sulfuric acid ester of the adduct of 2 mols of ethylene oxide with 1 mol of lauryl alcohol;

$A_{11}$ the sodium salt of the acid sulfuric acid ester of the adduct of 3 mols of ethylene oxide with 1 mol of lauryl alcohol;

$A_{12}$ the acid phosphoric acid ester of the adduct of 5 mols of ethylene oxide with 1 mol of 2-ethyl-n-hexanol;

$A_{13}$ the ammonium salt of the acid sulfuric acid ester of the adduct of 3 mols of ethylene oxide with 1 mol of butylphenol;

$A_{14}$ the ammonium salt of the acid sulfuric acid ester of the adduct of 5 mols of ethylene oxide with 1 mol of tributylphenol;

$A_{15}$ the ammonium salt of the acid sulfuric acid ester of the adduct of 2 mols of ethylene oxide with 1 mol of nonylphenol;

$A_{16}$ the ammonium salt of the acid sulfuric acid ester of the adduct of 10 mols of propylene oxide and 10 mols of ethylene oxide with 1 mol of nonylphenol;

$A_{17}$ the ammonium salt of the acid sulfuric acid ester of the adduct of 35 mols of ethylene oxide with 1 mol of nonylphenol;

$A_{18}$ the ammonium salt of the acid sulfuric acid ester of the adduct of 50 mols of ethylene oxide with 1 mol of nonylphenol;

$A_{19}$ the ammonium salt of the acid sulfuric acid ester of the adduct of 15 mols of propylene oxide with 1 mol of nonylphenol;

$A_{20}$ the ammonium salt of the acid sulfuric acid ester of the adduct of 6 mols of ethylene oxide with 1 mol of dodecylphenol;

$A_{21}$ the ammonium salt of the acid sulfuric acid ester of the adduct of 6 mols of ethylene oxide with 1 mol of pentadecylphenol;

$A_{22}$ the ammonium salt of the acid sulfuric acid ester of the adduct of 8 mols of ethylene oxide with 1 mol of o-phenyl-phenol;

A23 the sodium salt of the acid maleic acid ester of the adduct of 2 mols of ethylene oxide with 1 mol of p-nonyl-phenol;

A24 the sodium salt of the acid monosulfosuccinic acid ester of the adduct of 2 mols of ethylene oxide with 1 mol of p-nonylphenol;

A25 the ammonium salt of the acid phosphoric acid ester of the adduct of 2 mols of ethylene oxide with 1 mol of nonyl-phenol;

A26 the sodium salt of the acid sulfuric acid ester of the adduct of 12 mols of ethylene oxide with 1 mol of dibenzylphenol;

A27 the sodium salt of the acid sulfuric acid ester of the adduct of 15 mols of ethylene oxide with 1 mol of dibenzyl-(nonyl)-phenol;

A28 the acid phosphoric acid ester of the adduct of 10 mols of ethylene oxide with 1 mol of p-nonylphenol;

A29 the ammonium salt of the acid sulfuric acid ester of the adduct of 15 mols of ethylene oxide with 1 mol of stearic acid $\beta$-hydroxyethylamide;

A30 the ammonium salt of the acid disulfuric acid ester of the adduct of 3 mols of ethylene oxide with 1 mol of (tallow fat)-amine;

A31 the ammonium salt of the acid disulfuric acid ester of the adduct of 8 mols of ethylene oxide with 1 mol of (tallow fat)-amine;

A32 the ammonium salt of the acid disulfuric acid ester of the adduct of 3 mols of propylene oxide and 5 mols of ethylene oxide with 1 mol of (tallow fat)-amine;

A33 the ammonium salt of the acid diphosphoric acid ester of the adduct of 8 mols of ethylene oxide with 1 mol of (tallow fat)-amine;

A34 the ammonium salt of the acid disulfuric acid ester of the adduct of 1 mol of styrene oxide and 8 mols of ethylene oxide with 1 mol of dodecylamine;

A35 the sodium salt of the acid sulfosuccinic acid half-ester of the adduct of 8 mols of ethylene oxide with 1 mol of (tallow fat)-amine.

A36 the ammonium salt of the acid disulfuric acid ester of the adduct of 4 mols of ethylene oxide with 1 mol of stearylamine;

A37 a mixture of the mono- and di-phosphoric acid ester (1:2) of the adduct of 8 mols of ethylene oxide with 1 mol of dodecylamine;

A38 a mixture of the mono- and di-phosphoric acid ester (1:2) of the adduct of 4 mols of ethylene oxide with 1 mol of laurylamine;

B. Cationic Polyalkylene Oxide Adducts

B1 the adduct of 4 mols of ethylene oxide with 1 mol of (tallow fat)-amine;

B2 the adduct of 8 mols of ethylene oxide with 1 mol of (tallow fat)-amine;

B3 the adduct of 3 mols of propylene oxide and 5 mols of ethylene oxide with 1 mol of (tallow fat)-amine;

B4 the adduct of 1 mol of styrene oxide and 8 mols of ethylene oxide with 1 mol of dodecylamine;

B5 the adduct, quaternised with chloroacetamide, of 8 mols of ethylene oxide with 1 mol of (tallow fat)-amine;

B6 the adduct, quaternised with dimethyl sulfate, of 30 mols of ethylene oxide with 1 mol of a $C_{18}$–$C_{22}$-fatty amine;

B7 the adduct, quaternised with dimethyl sulfate, of 30 mols of ethylene oxide with 1 mol of laurylamine;

B8 the adduct, quaternised with dimethyl sulfate, of 15 mols of ethylene oxide with 1 mol of laurylamine;

B9 the adduct, quaternised with dimethyl sulfate, of 15 mols of ethylene oxide with 1 mol of stearylamine;

B10 the adduct, quaternised with dimethyl sulfate, of 1 mol of styrene oxide and 30 mols of ethylene oxide with 1 mol of stearylamine;

B11 the adduct, quaternised with dimethyl sulfate, of 6 mols of propylene oxide and 30 mols of ethylene oxide;

B12 the adduct, quaternised with dimethyl sulfate, of 1 mol of styrene oxide and 20 mols of ethylene oxide with 1 mol of stearylamine;

B13 the adduct of the formula

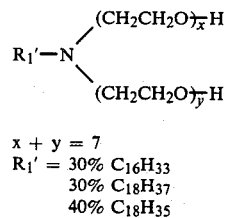

$x + y = 7$
$R_1' = 30\% \ C_{16}H_{33}$
$\phantom{R_1' =} 30\% \ C_{18}H_{37}$
$\phantom{R_1' =} 40\% \ C_{18}H_{35}$ C. Amphoteric Polyalkylene Oxide Adducts C1 the ammonium salt of the acid monosulfuric acid ester of the adduct of 3 mols of ethylene oxide with 1 mol of (tallow fat)-amine;

C2 the ammonium salt of the acid monosulfuric acid ester of the adduct of 4 mols of ethylene oxide with 1 mol of (tallow fat)-amine;

C3 the ammonium salt of the acid monosulfuric acid ester of the adduct of 6 mols of ethylene oxide with 1 mol of (tallow fat)-amine;

C4 the ammonium salt of the acid monosulfuric acid ester of the adduct of 8 mols of ethylene oxide with 1 mol of (tallow fat)-amine;

C5 the ammonium salt, quaternised with chloroacetamide, of the amphoteric sulfuric acid ester of the adduct of 8 mols of ethylene oxide with 1 mol of (tallow fat)-amine;

C6 the ammonium salt, quaternised with dimethyl sulfate, of the amphoteric sulfuric acid ester of the adduct of 30 mols of ethylene oxide with 1 mol of a $C_{18}$–$C_{22}$ fatty amine;

D. Non-ionic Polyalkylene Oxide Adducts

D1 the adduct of 6 mols of ethylene oxide with 1 mol of 2-ethylhexanol;

D2 the adduct of 5 mols of ethylene oxide with 1 mol of 2-ethylhexanol;

D3 the adduct of 15 mols of ethylene oxide with 1 mol of stearyl alcohol;

D4 the adduct of 3 mols of ethylene oxide with 1 mol of Alfol (8–10);

D5 the adduct of 5 mols of ethylene oxide with 1 mol of hexadecyl alcohol;

D6 the adduct of 18 mols of ethylene oxide with 1 mol of oleyl alcohol;

D7 the adduct of 6 mols of ethylene oxide with 2 mols of butyl-phenol;

D8 the adduct of 4 mols of ethylene oxide with 2 mols of p-cresol;

D9 the adduct of 5 mols of ethylene oxide with 1 mol of tributylphenol;

D10 the adduct of 8 mols of ethylene oxide with 1 mol of octylphenol;

$D_{11}$ the adduct of 2 mols of ethylene oxide with 1 mol of nonylphenol;

$D_{12}$ the adduct of 10 mols of ethylene oxide with 1 mol of nonylphenol;

$D_{13}$ the adduct of 10 mols of ethylene oxide and 10 mols of propylene oxide with 1 mol of nonylphenol;

$D_{14}$ the adduct of 18 mols of ethylene oxide with 1 mol of oleyl alcohol;

$D_{15}$ the adduct of 12 mols of ethylene oxide with 1 mol of oleic acid;

$D_{16}$ the adduct of 8 mols of ethylene oxide with 1 mol of o-phenylphenol;

$D_{17}$ the adduct of 5 mols of ethylene oxide and 5 mols of propylene oxide with 1 mol of Alfol 12–14;

$D_{18}$ the adduct of 15 mols of ethylene oxide with 1 mol of castor oil;

$D_{19}$ the adduct of 8 mols of propylene oxide with 1 mol of pentaerythritol;

$D_{20}$ the adduct of 35 mols of ethylene oxide and 15 mols of propylene oxide with 1 mol of glycerol;

$D_{21}$ the adduct of 7 mols of ethylene oxice with 1 mol of $C_9$–$C_{11}$-oxo-alcohol;

$D_{22}$ the adduct of 35 mols of ethylene oxide with 1 mol of p-nonylphenol;

$D_{23}$ the adduct of 2 mols of ethylene oxide with 1 mol of coconut oil fatty acid (N,N-bis-$\beta$-hydroxyethyl)amide;

$D_{24}$ the adduct of 5 mols of ethylene oxide with 1 mol of p-nonylphenol;

$D_{25}$ the adduct of 58 mols of propylene oxide with 1 mol of glycerol;

$D_{26}$ the adduct of 58 mols of propylene oxide with 1 mol of pentaerythritol.

EXAMPLE 1

A solution of 10 g of an adduct of 8 mols of ethylene oxide with 1 mol of octylphenol (component $D_{10}$) and 0.5 g of sodium lauryl-sulfate in 200 g of water is warmed to 90° C., while stirring and passing over nitrogen. A solution of 1 g of dibenzoyl peroxide in 40 g of acrylic acid is added dropwise to this solution in the course of 60 minutes. The solution is warmed at 90° C. for a further 3 hours to give 251 g of a viscous solution with a solids content of 20.5%, corresponding to a yield of 99%. On drying, the polymer solution leaves a clear film.

EXAMPLE 2

A solution of 15 g of an adduct of 10 mols of ethylene oxide with 1 mol of nonylphenol (component $D_{12}$) in 150 g of water is warmed to 70° C., while stirring and passing over nitrogen. A solution of 1 g of dibenzoyl peroxide in 35 g of acrylic acid is added dropwise to this solution in the course of 30 minutes. The solution is warmed at 70° C. for a further 3 hours to give 200 g of a viscous solution with a solids content of 25.2%, corresponding to a yield of 98.4%. On drying, the polymer solution leaves a clear, colourless, non-tacky film.

EXAMPLE 3

A solution of 20 g of an adduct of the formula

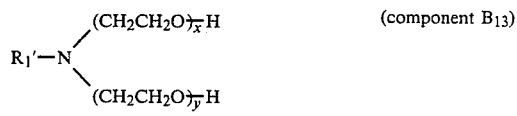

(component $B_{13}$)

$x + y = 7$
$R_1' = 30\%\ C_{16}H_{33}$
$30\%\ C_{18}H_{37}$
$40\%\ CH_3(CH_2)_7CH=CH(CH_2)_8$ in 50 g of water is warmed to 90° C., while stirring and passing over nitrogen. A solution of 97 g of dibenzoyl peroxide in 20 parts of acrylic acid is added dropwise in the course of 20 minutes, and this solution is warmed at 90° C. for a further 3 hours. After dilution with 95 g of water and addition of 8 g of 30% sodium hydroxide solution, 202 g of a viscous solution with a solids content of 25.1% are obtained, corresponding to a yield of 98.4%.

On drying, the polymer solution leaves a clear, brittle film.

EXAMPLE 4

A solution of 20 g of an adduct of 35 mols of ethylene oxide with 1 mol of nonylphenol (component $D_{22}$) and 0.5 g of sodium lauryl-sulfate in 200 g of water is warmed to 90° C., while stirring and passing over nitrogen. A solution of 2 g of dibenzoyl peroxide in 80 g of acrylic acid is added dropwise to this solution in the course of 60 minutes. The solution is warmed at 90° C. for a further 3 hours to give, after addition of 2 ml of 30% sodium hydroxide solution, 284 g of a viscous solution with a solids content of 20%, corresponding to a yield of 99.2%.

On drying, the polymer solution leaves a clear film.

EXAMPLE 5

A solution of 25 g of an adduct of 5 mols of ethylene oxide with 1 mol of nonylphenol (component $D_{24}$) in 50 g of water is warmed to 90° C., while stirring and passing over nitrogen. A solution of 1 g of dibenzoyl peroxide in 25 g of acrylic acid is added dropwise to this solution in the course of 30 minutes. The emulsion formed is warmed at 90° C. for a further 3 hours to give, after addition of 100 g of water, 201 g of an emulsion with a solids content of 25%, corresponding to a yield of 98.3%. On drying, the emulsion leaves a clear film.

EXAMPLE 6

A solution of 30 g of the acid phosphoric acid ester of an adduct of 10 mols of ethylene oxide with 1 mol of nonylphenol (component $A_{28}$) in 50 g of water is warmed to 90° C., while stirring and passing over nitrogen. A solution of 0.7 g of dibenzoyl peroxide in 20 g of acrylic acid is added dropwise to this solution in the course of 30 minutes. The solution is warmed at 90° C. for a further 3 hours to give, after addition of 100 g of water, 200 g of a viscous solution with a solids content of 25%, corresponding to a yield of 98.5%. On drying, the polymer solution leaves a clear film.

EXAMPLE 7

A solution of 25 g of an adduct of 58 mols of propylene oxide with 1 mol of glycerol (component $D_{25}$) in 100 g of water is warmed to 80° C., while stirring and passing over nitrogen. A solution of 1 g of dibenzoyl peroxide in 25 g of acrylic acid is added dropwise to this solution in the course of 30 minutes. The resulting emulsion is warmed at 80° C. for a further 3 hours to give, after addition of 50 g of water and 1 ml of 30% sodium hydroxide solution, 201 g of an emulsion with a solids content of 25%, corresponding to a yield of 99.4%. On drying, the emulsion leaves a clear film.

EXAMPLE 8

40 g of an adduct of 10 mols of ethylene oxide with 1 mol of nonylphenol (component $D_{12}$) are warmed to 90° C., while stirring and passing over nitrogen. A solution of 0.5 g of benzoyl peroxide in 10 g of acrylic acid is added dropwise in the course of 5 minutes and the contents of the flask are warmed at 90° C. for a further 2 hours. After dilution with 150 g of water, 200 g of a slightly viscous solution with a solids content of 25% are obtained, corresponding to a yield of 98.4%. On drying, the polymer solution leaves a clear, colourless, viscous liquid.

EXAMPLE 9

A solution of 25 g of an adduct of 10 mols of ethylene oxide with 1 mol of nonylphenol (component $D_{12}$) in 50 g of water is warmed to 90° C., while stirring and passing over nitrogen. A solution of 1 g of benzoyl peroxide in 25 g of acrylic acid is added dropwise in the course of 30 minutes, and this solution is warmed at 90° C. for a further 2 hours. After dilution with 100 g of water and addition of 5 g of 30% sodium hydroxide solution, 206 g of a viscous solution with a solids content of 25% are obtained, corresponding to a yield of 98.6%. On drying, the polymer solution leaves a clear, colourless, non-tacky film.

EXAMPLE 10

A solution of 37.5 g of the cationic component $B_{13}$ in 30 g of water is warmed to 90° C., while stirring and passing over nitrogen. A solution of 0.5 g of dibenzoyl peroxide in 12.5 g of acrylic acid is added dropwise to this solution in the course of 10 minutes. The solution is warmed at 90° C. for a further 3 hours to give, after addition of 120 g of water, 200.5 g of a viscous solution with a solids content of 25%, corresponding to a yield of 98.7%. On drying, the polymer solution leaves a clear film.

EXAMPLE 11

A solution of 10 g of an adduct of 2 mols of ethylene oxide with 1 mol of nonylphenol (component $D_{11}$) and 0.5 g of sodium lauryl-sulfate in 140 g of water is warmed to 90° C., while stirring and passing over nitrogen. A solution of 1 g of dibenzoyl peroxide in 40 g of acrylic acid is added dropwise to this solution in the course of 30 minutes. The resulting emulsion is warmed at 90° C. for a further 3 hours to give, after addition of 13 g of water, 204 g of an emulsion with a solids content of 25%, corresponding to a yield of 99.2%. On drying, the emulsion leaves a clear film.

EXAMPLE 12

A solution of 7.5 g of the cationic component $B_{13}$ in 150 g of water is warmed to 70° C., while stirring and passing over nitrogen. A solution of 0.5 g of dibenzoyl peroxide in 42.5 g of acrylic acid is added dropwise to this solution in the course of 30 minutes. The solution is warmed at 70° C. for a further 3 hours to give, after addition of 137 g of water, 337 g of a viscous solution with a solids content of 15%, corresponding to a yield of 99.5%. On drying, the polymer solution leaves a clear film.

EXAMPLE 13

A solution of 2.5 g of an adduct of 35 mols of ethylene oxide with 1 mol of nonylphenol (component $D_{22}$) in 150 g of water is warmed to 70° C., while stirring and passing over nitrogen. A solution of 0.5 g of dibenzoyl peroxide in 47.5 g of acrylic acid is added dropwise to this solution in the course of 30 minutes. The solution is warmed at 70° C. for a further 3 hours to give, after addition of 132 g of water, 332 g of a viscous solution with a solids content of 15%, corresponding to a yield of 98.8%. On drying, the polymer solution leaves a clear film.

EXAMPLE 14

A solution of 2.5 g of a polyethylene oxide adduct of the formula

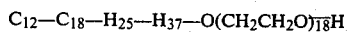

$$C_{12}-C_{18}-H_{25}-H_{37}-O(CH_2CH_2O)_{18}H$$

and 0.5 g of sodium lauryl-sulfate in 150 g of water is warmed to 70° C., while stirring and passing over nitrogen. A solution of 0.5 g of dibenzoyl peroxide in 24 g of acrylic acid and 23.5 g of methacrylic acid is added dropwise to this solution. The solution is warmed at 70° C. for 3 hours to give 200 g of an emulsion with a solids content of 25%, corresponding to a yield of 99.2%. On drying, the emulsion leaves a clear film.

EXAMPLE 15

20 g of an adduct of nonylphenol with 2 mols of ethylene oxide (component $D_{11}$) and 0.7 g of sodium lauryl-sulfate are warmed to 90° C. in 140 g of water, while stirring and passing over nitrogen. A solution of 1 g of benzoyl peroxide in 30 g of acrylic acid is added dropwise to this initial mixture in the course of 30 minutes. The resulting emulsion is warmed at 90° C. for a further 3 hours to give, after addition of 13 g of water, 204 g of a viscous emulsion with a solids content of 25%. On drying, the emulsion leaves a clear film.

EXAMPLE 16

A solution of 10 g of an adduct of nonylphenol with 10 mols of ethylene oxide (component $D_{12}$), 1 g of sodium lauryl-sulfate and 3 ml of sodium hydroxide solution (30%) in 209 g of water is warmed to 90° C., while stirring and passing over nitrogen. A solution of 1 g of benzoyl peroxide in 40 g of acrylic acid is added dropwise to this solution in the course of 60 minutes. The solution is warmed at 90° C. for a further 3 hours to give 261.5 g of a viscous solution with a solids content of 20%, corresponding to a yield of 98%. On drying, the solution leaves a clear film.

EXAMPLE 17

A solution of 10 g of component $B_{13}$ in 150 g of water is warmed to 70° C., while stirring and passing over nitrogen. A solution of 0.5 g of benzoyl peroxide in 40 g of acrylic acid is added dropwise to this solution in the course of 30 minutes. The solution is warmed at 70° C. for a further 4 hours to give, after addition of 45 g of water, 245.5 g of a highly viscous solution with a solids content of 20.3%, corresponding to a yield of 98.9%. On drying, the polymer solution leaves a clear film.

EXAMPLE 18

A solution of 25 g of an adduct of nonylphenol with 9 mols of ethylene oxide in 50 g of water is warmed to 90° C., while stirring and passing over nitrogen. A solution of 1 g of benzoyl peroxide in 25 g of acrylic acid is added dropwise to this solution in the course of 30 minutes. The reaction mixture is warmed at 90° C. for a further 2 hours to give, after addition of 95 g of water and 5 ml of aqueous sodium hydroxide solution (30%), 251 g of a viscous solution with a solids content of 20.1%, corresponding to a yield of 99%. On drying, the polymer solution leaves a clear film.

EXAMPLE 19

A solution of 30 g of component $D_{12}$ and 0.5 g of Na lauryl-sulfate in 150 g of water is warmed to 90° C., while stirring and passing over nitrogen. A solution of 1 g of benzoyl peroxide in 20 g of acrylic acid is added dropwise to this solution in the course of 30 minutes. The reaction mixture is warmed at 90° C. for a further 2 hours to give, after addition of 1 ml of aqueous sodium hydroxide solution (30%), 202.5 g of a viscous solution with a solids content of 25.3%, corresponding to a yield of 99.2%. After drying, the polymer solution leaves a clear film.

EXAMPLE 20

A solution of 20 g of component $D_{12}$ in 150 g of water is warmed to 90° C., while stirring and passing over nitrogen. A solution of 1 g of benzoyl peroxide in 30 g of acrylic acid is added dropwise to this solution in the course of 30 minutes. The reaction mixture is warmed at 90° C. for a further 2 hours to give, after addition of 1.5 ml of aqueous sodium hydroxide solution (30%), 202.5 g of a viscous solution with a solids content of 25.3%, corresponding to a yield of 98.8%. On drying, the polymer solution leaves a clear film.

EXAMPLE 21

A solution of 40 g of component $D_{12}$ and 0.5 g of Na lauryl-sulfate in 150 g of water is warmed to 70° C. while stirring and passing over nitrogen. A solution of 0.5 g of benzoyl peroxide in 10 g of acrylic acid is added dropwise to this solution in the course of 30 minutes. The reaction mixture is warmed at 70° C. for a further 5 hours to give, after addition of 2 ml of aqueous sodium hydroxide solution (30%), 203 g of a slightly viscous solution with a solids content of 25%, corresponding to a yield of 98.4%. On drying, the polymer solution leaves a clear film.

The procedure described in Example 21 is repeated, except that 15 g of component $D_{22}$ and 85 g of acrylic acid are used, giving the corresponding polymer, also in virtually quantitative yield.

EXAMPLE 22

A solution of 65 g of an adduct of 10 mols of ethylene oxide with 1 mol of nonylphenol (component $D_{12}$) in 65 g of water is warmed to 80° C., while stirring and passing over nitrogen. A solution of 65 g of 2-acrylamido-2-methyl-propanesulfonic acid in 65 g of water and, at the same time but separately, a solution of 0.3 g of potassium peroxide-disulfate in 30 g of water are added dropwise to this solution in the course of 30 minutes. The reaction mixture is kept at 80° C. for a further 2 hours and at 90° C. for 1 hour and is diluted with 230 g of water to give 520 g of a viscous yellowish solution with a solids content of 25%, corresponding to a yield of 100%. On drying, the polymer solution leaves a clear film.

The procedure described in Example 22 is repeated, except that the following combinations of starting substances are used in place of 65 g of component $D_{12}$ and 65 g of 2-acrylamido-2-methylpropanesulfonic acid: (a) 65 g of component $D_{12}$ and 65 g of acrylic acid, (b) 65 g of component $D_{12}$ and 65 g of methacrylic acid, (c) 52 g of component $A_{28}$ and 78 g of acrylic acid, (d) 65 g of component $A_{15}$ and 65 g of acrylic acid, (e) 65 g of component $A_{31}$ and 65 g of acrylic acid, (f) 65 g of component $A_8$ and 65 g of acrylic acid, (g) 65 g of the compound of the formula

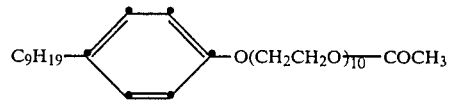

and 65 g of acrylic acid, (h) 65 g of component $D_{12}$ and 65 g of itaconic acid, dissolved in 150 g of water with the aid of sodium hydroxide solution (30%), or (i) 65 g of component $D_{12}$ and 65 g of maleic acid, dissolved in 150 g of water with the aid of 22.4 g of sodium hydroxide solution (30%), giving corresponding graft polymers, also in virtually quantitative yield.

EXAMPLE 23

A solution of 0.6 g of dibenzoyl peroxide in

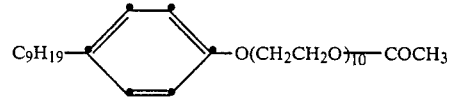

is warmed to 80° C., while stirring and passing over nitrogen. A solution of 40 g of maleic anhydride in 125 g of toluene is added dropwise to this solution in the course of 15 minutes. The solution is kept at 80° C. for 2 hours and at 90° C. for 1 hour and the toluene is subsequently distilled off in vacuo. The residue is dissolved in 237 g of water, by warming. 316 g of a brown solution with a solids content of 25% are obtained, corresponding to a yield of 98%. On drying, the solution leaves a viscous liquid.

EXAMPLE 24

A solution of 5 g of component $B_8$ in 180 g of water is warmed to 80° C., while stirring and passing over nitrogen. A solution of 1 g of dibenzoyl peroxide in 45 g of acrylic acid is added dropwise to this solution in the course of 30 minutes. The reaction mixture is kept at 80° C. for a further 2 hours and at 90° C. for 1 hour and 230 g of a viscous yellowish solution with a solids content of 22% are obtained, corresponding to a yield of 99.5%. On drying, the solution leaves a clear film.

EXAMPLE 25

An emulsion of 10 g of an adduct of 58 mols of propylene oxide with pentaerythritol (component $D_{26}$) in 180 g of water is warmed to 90° C., while stirring and passing over nitrogen. A solution of 1 g of benzoyl peroxide in 40 g of acrylic acid is added dropwise to this emulsion in the course of 120 minutes. The reaction mixture is warmed at 90° C. for a further 3 hours to give 230 g of a viscous emulsion with a solids content of 22%, corresponding to a yield of 99.5%. On drying, the emulsion leaves a clear film.

USE EXAMPLES

EXAMPLE 1

As a Greying Inhibitor in Detergents

A polyester/cotton (65/35) mixed fabric (165 g/m²) is padded with an aqueous liquor which contains 50 g/liter of 4,5-dihydroxy-N,N'-dimethylolethyleneurea (45% aqueous solution) and 15 g/liter of magnesium chloride.6H$_2$0 and has been adjusted to pH 6 with acetic acid. The liquor pick-up is 80%. The fabric is dried at 80° C. for 2 minutes and thermofixed at 160° C. for 4 minutes.

The fabric thus finished is treated with an artificially soiled wash liquor (liquor ratio 1:30) containing 6 g/liter of a standard detergent, 1 g/liter of lanolin, 4 g/liter of air filter dust and 1 g/liter of a graft polymer according to one of Examples 2, 3, 5 or 10, at 60° C. for 30 minutes. The fabric is then rinsed thoroughly with cold water. A fabric which shows very little soiling is obtained.

The fabric greying or the reflectance is measured with a spectrophotometer (filter 6/transmission maximum at 461 μm).

The corresponding percentage reflectance values are shown in the following table.

| Graft polymer according to Example No. | Reflectance in % |
| --- | --- |
| 2 | 78 |
| 3 | 67 |
| 5 | 65 |
| 10 | 63 |
| no polymer | 41 |
| not soiled | 100 |

EXAMPLE 2

Antifoam for Alcoholic Fermentation Processes

A solution consisting of 20 g of unrefined sugar from sugar cane, 10 g of molasses, 2 g of dried baker's yeast and 50 ppm of the graft polymer prepared according to Example 7 in 200 g of Permutit water is introduced into a 500 ml measuring cylinder.

This solution is left to stand for 3 hours to ferment. As a result of the addition of the graft polymer, no foam forms on the surface of the liquid during this time. The graft polymer does not interfere with the fermentation process.

EXAMPLE 3

Preparation of a Deaerator for Pulp Suspension 15 g of stearyl alcohol and 10 g of stearic acid are melted at 70° C. and dispersed, with stirring, in a solution which contains 3 g of the graft polymer prepared according to Example 1 in 72 g of water and has been warmed to 70° C. The dispersion is then cooled, with stirring.

A liquid, fine-particled and storage-stable dispersion which can readily be diluted in cold water and spreads spontaneously when applied to an aqueous surface is obtained.

The air content in a pulp suspension with an initial air content of 2.7% by volume is reduced to 0.75% by adding 0.05% (based on absolutely dry pulp) to this dispersion.

EXAMPLE 4

100 kg of a poly(ethylene glycol terephthalate) fabric are prewetted in 1,000 liters of water in a beam dyeing apparatus. The liquor is then heated to 70° C., after which the following additives are introduced: 3,000 g of a mixture of 70.0% of trimethylbenzene, 11.1% of paraffin oil, 13.4% of the ammonium salt of the acid sulfuric acid ester of the adduct of 2 mols of ethylene oxide with 1 mol of p-nonylphenol and 5.5% of the adduct of 9 mols of ethylene oxide with 1 mol of p-nonylphenol, 4,000 g of a dye of the formula

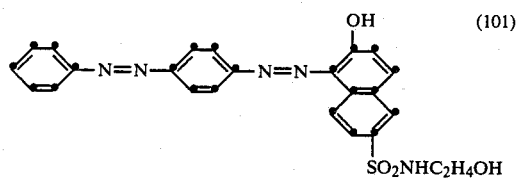

and 300 g of an aqueous emulsion (1) containing 10% of silicone oil, 40% of a 25% aqueous solution of the graft polymer prepared according to Example 11, 10% of 2-ethyl-n-hexanol and 40% of water.

The dye liquor is then brought to pH 5.5 with 85% formic acid and is heated to 120° C. in the course of 30 minutes, after which the fabric is dyed at this temperature for 30 minutes. The liquor is then cooled and the dyed fabric is rinsed and dried. A deep red dyeing which is fast to rubbing is obtained.

As a result of the addition of the emulsion (1), the dyeing system and the overflow vessel are always free from foam. The formation of light spots by the inclusion of air in the material is avoided.

EXAMPLE 5

100 kg of a poly(ethylene glycol terephthalate) yarn in 1,200 liters of water are warmed to 60° C. in a muff dyeing apparatus. The following additives are then introduced into the liquor: 2,400 g of ammonium sulfate, 2,000 g of a 70% aqueous solution of the ammonium salt of the acid sulfuric acid ester of an adduct of glycerol and propylene oxide of molecular weight 4,200, 3,700 g of a dye of the formula

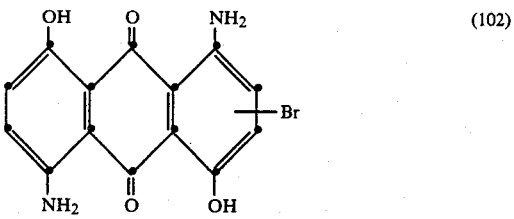

and 450 g of an aqueous emulsion (2) containing 15% of silicone oil, 12% of 2-ethyl-n-hexanol, 40% of a 35% aqueous solution of the graft polymer prepared according to Example 15, 3% of ethanolamine and 30% of water.

The dyebath is brought to pH 5 with 85% formic acid and is warmed to 130° C. in the course of 45 minutes, after which the yarn is dyed at this temperature for 60 minutes. The bath is then cooled and the dyed yarn is rinsed and dried. A deep, level blue dyeing which is fast to rubbing is obtained on the yarn thus dyed.

The dyebath, the overflow vessel and the muffs are completely deaerated by adding the emulsion (2).

EXAMPLE 6

100 kg of a fabric of 50% of cotton and 50% of poly(ethylene glycol terephthalate) are treated at 40° C. for 20 minutes, in a high temperature winch, with 3,000 g of an aqueous liquor containing 54 g of a dye of the formula

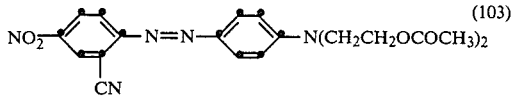
(103)

27 g of a dye of the formula

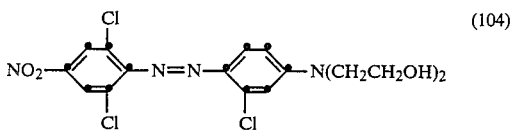
(104)

130 g of a dye of the formula

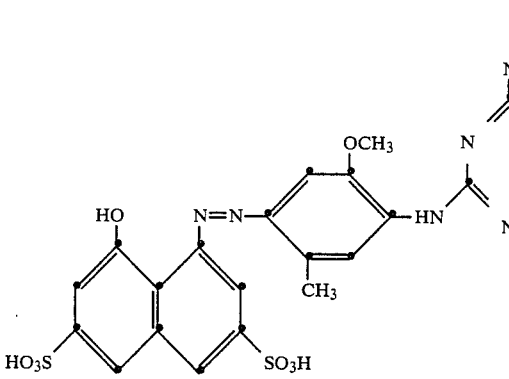
(105)

10 g of a dye of the formula

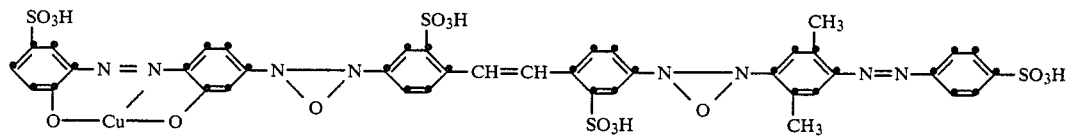
(106)

3,000 g of a mixture of 16.5% of phenylbenzoate, 38.5% of 2-methylphenylbenzoate, 8% of ethylene glycol, 17% of isopropanol, 2% of ethanolamine, 1.5% of pine oil and 16.5% of the acid phosphoric acid ester of the adduct of 10 mols of ethylene oxide with 1 mol of p-nonylphenol, 6,000 g of ammonium sulfate and 700 g of emulsion (1) according to Example 4 and having a pH value of 5.6. 10 kg of sodium sulfate are then added to the liquor and the liquor is heated to 115° C. in the course of 40 minutes. The fabric is dyed at this temperature for 30 minutes and the bath is then cooled. The dyed fabric is rinsed and dried.

Foam-free dyeing is possible by adding the emulsion (1). The fabric does not tend to float in the winch, which means a very level dyeing is obtained.

EXAMPLE 7

100 kg of knitted cotton goods are wetted in 600 liters of deionised water at 40° C. in a short liquor jet-dyeing apparatus. 36 kg of sodium chloride, 5 kg of a dye of the formula

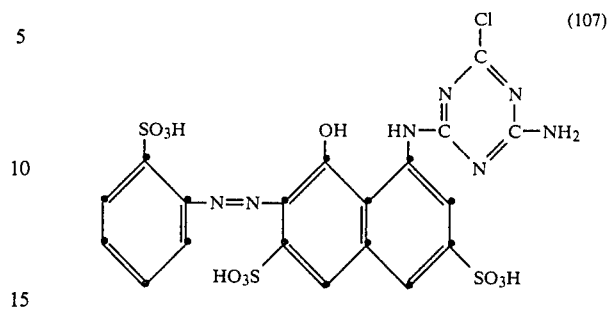
(107)

and 0.3 kg of emulsion (2) according to Example 5 are then added to the liquor.

The fabric is dyed in the short liquor jet-dyeing apparatus at 40° C. for 45 minutes. 0.6 kg of calcined sodium carbonate is then added, followed by 1.2 kg of aqueous 36% sodium hydroxide solution after a further 5 minutes. The knitted goods are dyed for a further 40 minutes and are then rinsed and washed. A fast, level red dyeing results on the knitted goods. There is no interference in the path of the goods during the dyeing process.

EXAMPLE 8

A cheese of 70 g of cotton is wetted in 500 ml of water at 30° C. in a circulatory apparatus. The following additives are then introduced into the liquor: 10 ml of aqueous 30% sodium hydroxide solution, 3 g of 86% sodium hydrosulfite solution, 0.3 g of emulsion (1) according to Example 4 and 0.5 g of a vat dye consisting of a mixture of Vat Blue 4 C.I. 69800 and Vat Blue 6 C.I. 69825 (1:3), which have been predispersed with water and 5 ml of 30% aqueous sodium hydroxide solution.

After uniform distribution of the additives, the dye liquor is warmed to 60° C. in the course of 30 minutes and the cotton is dyed at this temperature for 30 minutes. 6 g of sodium chloride are then added to the dye liquor, after which the cotton is dyed for a further 30 minutes at 60° C. The dyed material is then rinsed warm and cold and dried. A uniform, fast blue dyeing is obtained.

EXAMPLE 9

100 kg of knitted grey cotton goods are wetted, on a closed winch, in 2,500 liters of water to which 7,500 g of a formulation consisting of 43% of hydrolysed polymaleic anhydride (50% free acid), 14% of aqueous 25% ammonia solution and 43% of a 30% aqueous solution of a condensate of polyethylene glycol (molecular weight 1,500), maleic anhydride, the adduct of 8 mols of propylene oxide with 1 mol of pentaerythritol and stearic acid have been added. 40 liters of 30% aqueous sodium hydroxide solution and 10 kg of 86% sodium bisulfite solution are then added to the liquor. 2,000 g of emulsion (2) according to Example 5 are subsequently added. A stock vat consisting of 75 liters of water, 2,500 g of 85% aqueous sodium bisulfite solution, 6 liters of aqueous 30% sodium hydroxide solution, 1,000 g of the vat dye Vat Yellow 3 C.I. 67300 and 500 g of the vat dye Vat Violet 9 C.I. 60005 is subsequently added.

The dye liquor is warmed to 70° C. in the course of 30 minutes and the cotton is dyed at this temperature for 30 minutes. The dyed material is then rinsed, and oxidised in running cold water. After drying, a level dyeing results. The knitted goods have a pleasantly soft handle and are free from creases.

As a result of adding the emulsion (2), the system is free from foam and the knitted goods do not tend to float.

EXAMPLE 10

Sludge Dewatering Assistant.

625 ppm of a graft polymer prepared according to Example 16 are added to 50 ml of an industrial sewage sludge with a solids content of 1.6%, and the mixture is stirred for 2 minutes. This sample of sludge is then filtered through a funnel with a cotton filter (grey cotton, 210 g/m$^2$), the filtrate being collected in a measuring cylinder. After 10 minutes, 39.5 ml of filtrate have collected. A comparison sample without the addition of the above graft polymer results in an amount of filtrate of only 13.5 ml.

EXAMPLE 11

Antifoam for Seawater Desalination Plants.

A 7% aqueous sodium chloride solution serves as a seawater model. 400 ml of this sodium chloride solution are heated to 90° C. in a glass cylinder. 16 liters of air per hour are then passed into the test solution through a finepored glass frit. After 3 minutes, a foam height of 3.5 cm is established. Foaming is prevented for at least 30 minutes by adding 0.5 ppm of the graft polymer prepared according to Example 7.

EXAMPLE 12

A severely foaming, industrial effluent with a surface tension of 32.7 dynes/cm is sprayed into the activated sludge basins of a sewage purification plant with the emulsion (1) according to Example 4, which has been diluted with water in a ratio of 100:1. The amount of emulsion added is metered such that 5 ppm are used for the entire amount of effluent. It is thereby possible to keep the level of foam on the effluent constant at about 10 to 20 cm. Without the use of the emulsion (1), so much foam forms that the activated sludge basins froth over after about 30 to 60 minutes. Similar results are achieved if 5 ppm of emulsion (2) according to Example 5, which has been diluted in a ratio of 100:1, is used instead of emulsion (1) according to Example 4. It should also be noted that the severe foaming is greatly promoted by introduction of air by means of a large paddle-type stirrer. However, this introduction of air is necessary to facilitate biological degradation of the ballast substances.

EXAMPLE 13

15 ppm of sodium dodecylbenzenesulfonate are added to 1,000 ml of water (water temperature: 20° to 25° C.) and the mixture is foamed with the aid of a mixer and by blowing in air (32 liters of air/hour). After 5 minutes, a foam height of 10 cm is achieved. 3 ppm of emulsion (1) according to Example 4, which had first been diluted with water in a ratio of 100:1, are then added. After 2 seconds, the foam is eliminated completely. No renewed foaming by further mixing and blowing in air is observed even after 30 minutes. If the test is carried out in the same way but without adding the emulsion (1), the foam rises to a height of over 15 cm.

EXAMPLE 14

One liter of black liquor (effluent from the alkaline pulping of wood in the manufacture of cellulose) is heated to 80° C. in a glass beaker and foam is produced by means of a vibratory mixer.

The air is metered in through the vibratory mixer. At a foam height of 13 cm, in each case 250 ppm of emulsion (1) according to Example 4 or an aqueous emulsion (3) containing 10% of silicone oil, 10% of 2-ethyl-n-hexanol, 2% of a siloxane-oxyalkylene copolymer having a turbidity point of 38° C. (silicone surfactant L 546), 40% of a 35% aqueous solution of the graft polymer prepared according to Example 15, 3% of ethanolamine and 35% of water are metered in. The foam is eliminated completely (permanent effect). If conventional silicone antifoam emulsions are used, an antifoam effect can indeed be achieved spontaneously, but is not permanent. The particular effect of emulsions (1) or (3) can be attributed to the fact that these are very stable towards alkali. The pH value of the black liquor is about 13.5.

EXAMPLE 15

Foam is produced in an industrial waste-air purification plant to an increasing extent by dyes and surfactants removed from the air. Foaming can be avoided completely by adding 400 ppm of emulsion (1) according to Example 4 or emulsion (3) according to Example 14.

EXAMPLE 16

Detergent with A Soil Redeposition Inhibitor Effect

A polyester and cotton mixed fabric artificially soiled with carbon black and engine oil is washed according to the following washing process. Washing process:
Apparatus: AHIBA dyeing apparatus with a twisted thread
Temperature/time: 30 minutes at 60° C.
Amount used: in each case 1 g/liter of active substance
pH value: adjusted to pH 10 with sodium carbonate
Liquor ratio: 1:20

When the washing operation has ended, the fabrics are each rinsed separately in cold water, drained and dried.

The colour difference is then measured in accordance with DIN 6174. The fabric has a reflection number of 0, before being washed out. The higher the number, the better the washing effect.

| Washing procedure/active substances | Reflection number in accordance with DIN 6174 |
| --- | --- |
| Permutit water by itself, without an active substance | 10.49 |
| Adduct of 9 mols of ethylene oxide with 1 mol of nonylphenol | 26.07 |
| Graft polymer according to Example 21, last paragraph | 29.0 |
| Graft polymer according to Example 12 | 28.37 |
| Graft polymer according to Example 17 | 30.3 |
| Graft polymer according to Example 3 | 31.77 |
| Graft polymer according to Example 2 | 30.13 |
| Graft polymer according to Example 5 | 30.77 |
| Graft polymer according to Example 18 | 35.38 |
| Graft polymer according to Example 19 | 33.35 |
| Graft polymer according to Example 20 | 32.46 |
| Graft polymer according to Example 21 | 34.0 |

The better washing effect of the graft polymers in comparison with that of the nenylphenol glycol ether is to be attributed to the fact that the graft plymers also effectively prevent re-abosorption of the soil removed.

EXAMPLE 17

Antistactic for Polyamide Carpets

A polyamide 6,6 carpet is washed, at 40° C. for 30 minutes, with a liquor (liquor ratio 1:40) containing 1 g/liter of a mixture of sodium 1-benzyl-2-heptacdecyl-benzimidazole-disulfonate and coconut oil fatty acid diethanolamide (2:1), 1 g/liter of trisodium phosphate and 1 g/liter of sodium ethylenediaminetetraacetate. 100 g of this prewashed carpet are then treated with an aqueous solution which has been prepared from 1 g of the graft polymer, as the 100% pure dry substance, prepared according to Example 20, 5 g of sodium acetate and 4 liters of Permutit water and has been brought to pH 5 with acetic acid. The treatment is carried out at the boiling point and lasts 30 minutes. After the treatment, the carpet is rinsed and dried. The carpet thus treated has an electrostatic charge of 870 volts. In contrast, the electrostatic charge of the carpet which has only been prewashed is 8,350 volts.

EXAMPLE 18

2.5 g of an artificially soiled cotton fabric (EMPA test fabric, soiled with carbon black, mineral oil, protein, ink and iron oxide) and 2.5 g of a concomitant cotton fabric are washed in a wash liquor at 40° C. for 30 minutes. The wash liquor contains 100 ml of water of 10°-11° German hardness and 0.4 g of a liquid detergent (1) consisting of 98% of a 25% aqueous solution of the graft polymer according to Example 9 and 2% of carboxymethylcellulose, as well as 50 g of glass beads of 2 mm diameter. The wash liquor is also brought to a pH value of 10 with sodium carbonate. After washing, the fabric is rinsed and dried. The washing effect is evaluated on the basis of the brightening of the soiled fabric which occurs on washing. The grey scale BS 2662/1961 serves as a measure. Rating 5 represents the best effect (virtually unachievable with this test fabric) and rating 1 represents the least effect (no washing effect).

After the treatment, the washed fabric has a rating of 4.

The soiling of the concomitant fabric is measured colorimetrically, the whiteness being determined by the Ciba-Geigy method.

Before the treatment, the whiteness of the concomitant fabric is 72. The whiteness resulting after the treatment is 70. There is thus virtually no re-absorption of the soil removed.

Instead of the detergent (1) used, the following detergents (2), (3) and (4) can be used with similar success.

Detergent (2) consisting of 50% of the graft polymer (100% pure), according to Example 20, 20% of sodium perborate, 5% of sodium metasilicate, 2% of soap flakes, 1% of carboxymethylcellulose, 0.1% of fluorescent brightener and 21.9% of sodium sulfate.

Detergent (3) consisting of 40% of the graft polymer (100% pure) according to Example 20, 15% of sodium perborate, 5% of sodium metasilicate, 2% of soap flakes, 1% of carboxymethylcellulose, 0.1% of fluorescent brightener, 31.7% of penta-sodium phosphate and 0.2% of magnesium silicate.

Detergent (4) consisting of 72% of the graft polymer (25% pure) according to Example 9 and 28% of an adduct of 3 mols of ethylene oxide with 1 mol of an oxo-alcohol, for example 2-ethyl-hexanol.

EXAMPLE 19

A mixed fabric of polyester and cotton artificially soiled with carbon black and engine oil is washed in accordance with the following washing process.

Washing process: AHIBA dyeing apparatus with twisted thread
Temperature/time: 30 minutes at 60° C.
pH value: adjusted to pH 10 with sodium carbonate
Liquor ratio: 1:20
Water hardness: 10° German hardness After the washing, the goods are rinsed, drained and dried. The colour difference is then determined in accordance with DIN 6174. The fabric has a reflection number of 0 before being washed out. The higher the number obtained, the better is the washing effect.

The amounts used and the results are illustrated in the table which follows.

| Amount g/liter | Detergent (combinations) | Colour difference Reflection number in accordance with DIN 6174 |
| --- | --- | --- |
| 2 | Sodium 1-benzyl-2-heptadecyl-benzimidazole-disulfonate | 1.9 |
| 3 | Graft polymer according to Example 22, paragraph (a) | 23.9 |
| 0.5 | Graft polymer according to Example 22, paragraph (a) | |
| 0.5 | Oligomer mixture of phosphoric acid esters in accordance with U.S. Pat. No. 4,254,063 | 20.6 |
| 0.5 | Graft polymer according to Example 22, paragraph (a) | |
| 0.7 | N—Myristyl-N,N—dimethyl-amino-oxide | 24.4 |

What is claimed is:

1. A water-soluble or water-dispersible graft polymer comprising: (a) as a parent chain an anionic, cationic, amphoteric or non-ionic polyalkylene oxide containing from 2 to 200 —C—C—O— groups; (b) at least one hydrophobic radical bound to said polyalkylene oxide and comprising a straight or branched alkyl or alkenyl chain of 8 to 22 carbon atoms, alkylphenyl containing from 4 to 16 carbon atoms in the alkyl chain, or phenyl substituted with a phenyl group; and (c) at least 20% by weight of hydrophilic graft substituent derived from ethylenically unsturated polymerizable monomers containing hydrophilic groups and grafted onto carbon atoms in said polyalkylene oxide chain.

2. A graft polymer according to claim 1 wherein the hydrophilic groups of said hydrophilic side chains are acidic water solubilizing groups.

3. A graft polymer according to claim 1 wherein said polyalkylene oxide is non-ionic polyalkylene oxide, one hydrophobic radical is bound to one terminus of said non-ionic polyalkylene oxide, and the second terminal hydroxyl group of said polyalkylene oxide chain is unsubstituted.

4. A graft polymer according to claim 3, wherein the parent chain consists of a radical of an adduct of 2 to 200 mols of an alkylene oxide with 1 mol of an aliphatic monoalcohol having a least 8 carbon atoms, of a tri-, tetra-penta- or hexa-hydric aliphatic alcohol, of a phenol which is unsubstituted or substituted by alkyl, benzyl or phenyl, or of a fatty acid having 8 to 22 carbon atoms.

5. A graft polymer according to claim 4, wherein the parent chain consists of a radical of an adduct of 2 to 40 mols of ethylene oxide with 1 mol of a fatty alcohol or fatty acid, each having 12 to 22 carbon atoms, or with 1 mol of an alkylphenol having a total of 4 to 12 carbon atoms in the alkyl moiety.

6. A graft polymer according to claim 1, which contains, in the parent chain, the radical of an acid ester, or salt thereof, of an adduct of 2 to 100 mols of ethylene oxide with 1 mol of a fatty alcohol having 12 to 22 carbon atoms or with 1 mol of a phenol containing at least one benzyl group, one phenyl group or one alkyl group having at least 4 carbon atoms.

7. A graft polymer according to claim 6, which contains, in the parent chain, the radical of an anionic polyalkylene oxide adduct of the formula $$Y-O-(CH_2-CH_2O)_{\overline{m}}X \quad (1)$$

wherein Y is alkyl or alkenyl, each having 8 to 22 carbon atoms, alkylphenyl having 4 to 16 carbon atoms in the alkyl moiety or o-phenylphenyl, X is the acid radical of an inorganic oxygen-containing acid or the radical of an organic acid and m is 2 to 40.

8. A graft polymer according to claim 7, which contains, in the parent chain, the radical of an anionic polyalkylene oxide adduct of the formula

(2)

wherein Y' is octyl or nonyl, $m_1$ is 2 to 15 and X' is derived form sulfuric acid or o-phosphoric acid, and the adduct is in the form of the free acid or the sodium or ammonium salt.

9. A graft polymer according to claim 1, which contains, in the parent chain, the radical of a cationic polyalkylene oxide adduct of the formula

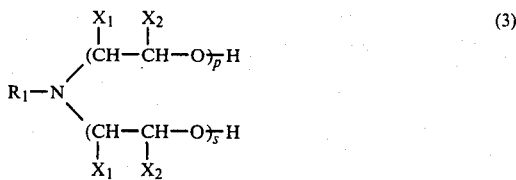

wherein $R_1$ alkyl or alkenyl, each having 10 to 22 carbon atoms, one of the radicals $X_1$ and $X_2$ is hydrogen or methyl and the other is hydrogen and p and s are integers, the sum p+s being 3 to 25.

10. A graft polymer according to claim 1, which contains, in the parent chain, the radical of a cationic polyalkylene oxide adduct of the formula

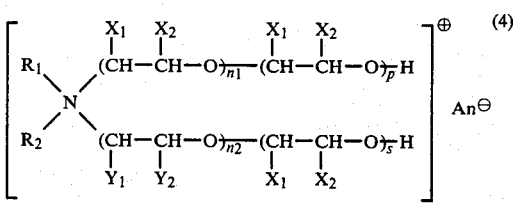

wherein $R_1$ is alkyl or alkenyl, each having 10 to 22 carbon atoms, $R_2$ is alkyl having 1 to 4 carbon atoms, hydroxyalkyl having 2 to 4 carbon atoms, carbamoylmethyl or benzyl, one of the radicals $Y_1$ and $Y_2$ is hydrogen and the other is phenyl, one of the radicals $X_1$ and $X_2$ is hydrogen or methyl and the other is hydrogen, $An^\ominus$ is the anion of an inorganic or organic acid, $n_1$ and $n_2$ are 0 or 1 and p and s are integers, the sum p+s being 3 to 25.

11. A graft polymer according to claim 1, which contains, in the parent chain, the radical of a monosulfuric acid ester of an adduct of 3 to 15 mols of ethylene oxide with 1 mol of a fatty amine having 12 to 22 carbon atoms.

12. A graft polymer according to claim 1, which contains, in the side chains, monocarboxylic acids having 3 to 5 carbon atoms as grafted-on monomers.

13. A graft polymer according to claim 12, which contains acrylic acid grafted on in the side chains.

14. A graft polymer according to claim 1, which comprises 5 to 80% by weight of an anionic, cationic, amphoteric or non-ionic polyalkylene oxide adduct in the parent chain and 95 to 20% by weight of the monomers grafted on in the side chain.

15. A graft polymer according to claim 14, which contains 5 to 50% by weight of the polyalkylene oxide adduct in the parent chain and 95 to 50% by weight of the monomers grafted on in the side chains.

16. A graft polymer according to claim 1, which contains, in the parent chain, the radical of an adduct of 2 to 40 mols of ethylene oxide with 1 mol of a fatty alcohol having 12 to 22 carbon atoms or with 1 mol of an alkylphenol having a total of 4 to 12 carbon atoms in the alkyl moiety, and, in the side chains, at least 30% by weight, based on the graft polymer, of grafted-on acrylic acid.

17. A graft polymer according to claim 16, which contains, as the parent chain, the radical of the adduct of 2 to 35 mols of ethylene oxide with 1 mol of octylphenol or nonylphenol.

18. A graft polymer according to claim 1, which contains, in the parent chain, the radical of an adduct of 3 to 40 mols of ethylene oxide with 1 mole of a fatty amine having 10 to 22 carbon atoms, and, in the side chains, at least 30% by weight, based on the graft polymer, of grafted-on acrylic acid.

19. An aqueous solution or emulsion, which comprises a graft polymer according to claim 1.

20. A process for the preparation of a water-soluble or water-dispersible graft polymer, which comprises bringing together (1) an anionic, cationic, amphoteric or non-ionic polyalkylene oxide adduct containing a hydrophobic radical and a polyglycol ether chain of 2 to 200

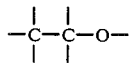

groups and (2) at least 20% by weight, based on the graft polymer, of an ethylenically unsaturated polymerisable monomer containing hydrophilic groups, and carrying out the polymerisation in the presence of a catalyst.

21. A process according to claim 20, wherein an organic or inorganic initiator which forms free radicals is used as the catalyst.

22. A graft polymer according to claim 4, wherein the parent chain is the adduct of 10 mols of ethylene oxide with 1 mol of nonylphenol.

23. A graft polymer according to claim 15 which contains 50% by weight of the adduct of 10 mols of ethylene oxide with 1 mol of nonylphenol and 50% by weight of acrylic acid.

24. A graft polymer according to claim 8, wherein the parent chain is the acid phosphoric acid ester of the adduct of 5 to 12 mols of ethylene oxide with 1 mol of p-nonylphenol.

* * * * *